(12) United States Patent
Jones

(10) Patent No.: US 10,320,516 B1
(45) Date of Patent: Jun. 11, 2019

(54) ALIGNMENT MARKER GENERATION AND DETECTION FOR COMMUNICATION

(71) Applicant: Xilinx, Inc., San Jose, CA (US)

(72) Inventor: Ben. J. Jones, Edinburgh (GB)

(73) Assignee: XILINX, INC., San Jose, CA (US)

( * ) Notice: Subject to any disclaimer, the term of this patent is extended or adjusted under 35 U.S.C. 154(b) by 196 days.

(21) Appl. No.: 15/199,825

(22) Filed: Jun. 30, 2016

(51) Int. Cl.
| | | |
|---|---|---|
| *H04L 7/00* | (2006.01) | |
| *H04J 99/00* | (2009.01) | |
| *H04J 13/00* | (2011.01) | |
| *H04J 11/00* | (2006.01) | |

(52) U.S. Cl.
CPC .......... *H04J 15/00* (2013.01); *H04J 13/0044* (2013.01); *H04J 13/0048* (2013.01); *H04J 2011/0096* (2013.01)

(58) Field of Classification Search
CPC ................................................ H03H 17/0254
See application file for complete search history.

(56) References Cited

U.S. PATENT DOCUMENTS

| | | | |
|---|---|---|---|
| 5,844,946 A * | 12/1998 | Nagayasu | ............. H03M 13/00 375/341 |
| 6,345,069 B1 * | 2/2002 | Dabak | ................. H04B 1/70757 375/152 |
| 7,099,426 B1 | 8/2006 | Cory et al. | |
| 7,398,334 B1 * | 7/2008 | Thorpe | ............... G06F 13/4018 710/29 |
| 7,551,646 B1 | 6/2009 | Zhang et al. | |
| 7,668,238 B1 | 2/2010 | Rokhsaz et al. | |
| 7,834,658 B1 | 11/2010 | Neuendorffer | |
| 7,913,104 B1 | 3/2011 | Cory et al. | |
| 7,924,912 B1 | 4/2011 | Rokhsaz et al. | |
| 8,024,678 B1 | 9/2011 | Taylor et al. | |
| 8,115,512 B1 * | 2/2012 | O'Dwyer | ................ H03M 9/00 326/40 |
| 8,116,162 B1 | 2/2012 | Wennekamp | |
| 8,229,049 B1 | 7/2012 | Logue | |
| 8,446,195 B2 | 5/2013 | Swanson | |
| 8,504,745 B1 | 8/2013 | Fischaber et al. | |

\* cited by examiner

*Primary Examiner* — Mansour Oveissi

(74) *Attorney, Agent, or Firm* — W. Eric Webostad; John J. King

(57) ABSTRACT

Apparatus and method for communication is disclosed. In an apparatus, at least one transmission circuit is configured to provide an output alignment marker representing an exclusive disjunction of an orthogonal sequence and an input alignment marker. A multiplexer is configured to multiplex the output alignment marker with payload data for transmission via a communication lane of a plurality of communication lanes.

11 Claims, 10 Drawing Sheets

$$H_2^k = \begin{bmatrix} H_2^{k-1} & H_2^{k-1} \\ H_2^{k-1} & \neg H_2^{k-1} \end{bmatrix}$$

FIG. 1A
(prior art)

$$H_2^4 = \begin{bmatrix}
0\ 0\ 0\ 0\ 0\ 0\ 0\ 0\ 0\ 0\ 0\ 0\ 0\ 0\ 0\ 0 \\
0\ 1\ 0\ 1\ 0\ 1\ 0\ 1\ 0\ 1\ 0\ 1\ 0\ 1\ 0\ 1 \\
0\ 0\ 1\ 1\ 0\ 0\ 1\ 1\ 0\ 0\ 1\ 1\ 0\ 0\ 1\ 1 \\
0\ 1\ 1\ 0\ 0\ 1\ 1\ 0\ 0\ 1\ 1\ 0\ 0\ 1\ 1\ 0 \\
0\ 0\ 0\ 0\ 1\ 1\ 1\ 1\ 0\ 0\ 0\ 0\ 1\ 1\ 1\ 1 \\
0\ 1\ 0\ 1\ 1\ 0\ 1\ 0\ 0\ 1\ 0\ 1\ 1\ 0\ 1\ 0 \\
0\ 0\ 1\ 1\ 1\ 1\ 0\ 0\ 0\ 0\ 1\ 1\ 1\ 1\ 0\ 0 \\
0\ 1\ 1\ 0\ 1\ 0\ 0\ 1\ 0\ 1\ 1\ 0\ 1\ 0\ 0\ 1 \\
0\ 0\ 0\ 0\ 0\ 0\ 0\ 0\ 1\ 1\ 1\ 1\ 1\ 1\ 1\ 1 \\
0\ 1\ 0\ 1\ 0\ 1\ 0\ 1\ 1\ 0\ 1\ 0\ 1\ 0\ 1\ 0 \\
0\ 0\ 1\ 1\ 0\ 0\ 1\ 1\ 1\ 1\ 0\ 0\ 1\ 1\ 0\ 0 \\
0\ 1\ 1\ 0\ 0\ 1\ 1\ 0\ 1\ 0\ 0\ 1\ 1\ 0\ 0\ 1 \\
0\ 0\ 0\ 0\ 1\ 1\ 1\ 1\ 1\ 1\ 1\ 1\ 0\ 0\ 0\ 0 \\
0\ 1\ 0\ 1\ 1\ 0\ 1\ 0\ 1\ 0\ 1\ 0\ 0\ 1\ 0\ 1 \\
0\ 0\ 1\ 1\ 1\ 1\ 0\ 0\ 1\ 1\ 0\ 0\ 0\ 0\ 1\ 1 \\
0\ 1\ 1\ 0\ 1\ 0\ 0\ 1\ 1\ 0\ 0\ 1\ 0\ 1\ 1\ 0
\end{bmatrix}$$

Row 2

FIG. 1B
(prior art)

Alignment Marker ("AM") 125

| 011101101010000011011001101100 11... |

XOR 128

| 000000001111111100000000011111111... |

(Oversampled) Hadamard Sequence 126

= Output Port 101

| 011101100101111111011001010011100... |

Output Seq. 129

ALIGNMENT MARKER GENERATION AND DETECTION FOR COMMUNICATION

FIELD OF THE INVENTION

The following description relates to integrated circuit devices ("ICs"). More particularly, the following description relates to alignment marker generation and detection for communication.

BACKGROUND

Some conventional high-speed communication protocols (such as Ethernet) involve data to be transmitted in parallel on a number of distinct physical lanes. This allows a total bandwidth of a port not to be limited to the maximum possible bandwidth of a single physical lane. For example, a 100 gigabit per second ("Gbps") communication link could be carried over ten 10 Gbps physical lanes or four 25 Gbps physical lanes. When data to be transmitted ("TX data") is transmitted by striping over multiple physical lanes, such data may arrive at a receiver with a differing amount of inter-lane skew, which may involve deskewing one or more physical lanes. Moreover, identification of which streams of data ("virtual lanes") are received on which physical lane may be an issue.

SUMMARY

An apparatus relates generally to transmission. In such an apparatus, at least one transmission circuit is configured to provide an output alignment marker representing an exclusive disjunction of an orthogonal sequence and an input alignment marker. A multiplexer is configured to multiplex the output alignment marker with payload data for transmission via a communication lane of a plurality of communication lanes.

An apparatus relates generally to reception. In such an apparatus, a storage circuit is configured to provide an input alignment marker. An exclusive disjunction circuit is configured to receive the input alignment maker and input data from a communication lane and to exclusively-OR the input alignment marker and the input data to provide an output sequence. The input data has an output alignment marker associated with an orthogonal sequence. A soft-decision block is configured to receive the output sequence and provide a stream of soft-decision values for the output sequence. A transform block is configured to receive the stream of soft-decision values and transform the stream of soft-decision values into a soft-decision marker. A hard-decision block is configured to receive the soft-decision marker and provide a hard-decision for the soft-decision marker. The hard-decision is a lane vector for the communication lane.

A method relates generally to communication. In such a method, an orthogonal sequence is output from a first storage circuit, and an input alignment marker is output from a second storage circuit. The orthogonal sequence and the input alignment marker are added modulo two with an exclusive disjunction circuit to provide an output alignment marker for association with a communication lane of a plurality of communication lanes.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1A is an equation diagram for a well-known general equation for a Hadamard matrix, H, for k a positive integer equal to or greater than 1.

FIG. 1B is a matrix diagram illustratively depicting an exemplary Hadamard matrix, H, equation following from FIG. 1A.

FIG. 2 is a flow-block diagram illustratively depicting an exemplary output sequence generation flow.

DETAILED DESCRIPTION

Figure 3A:
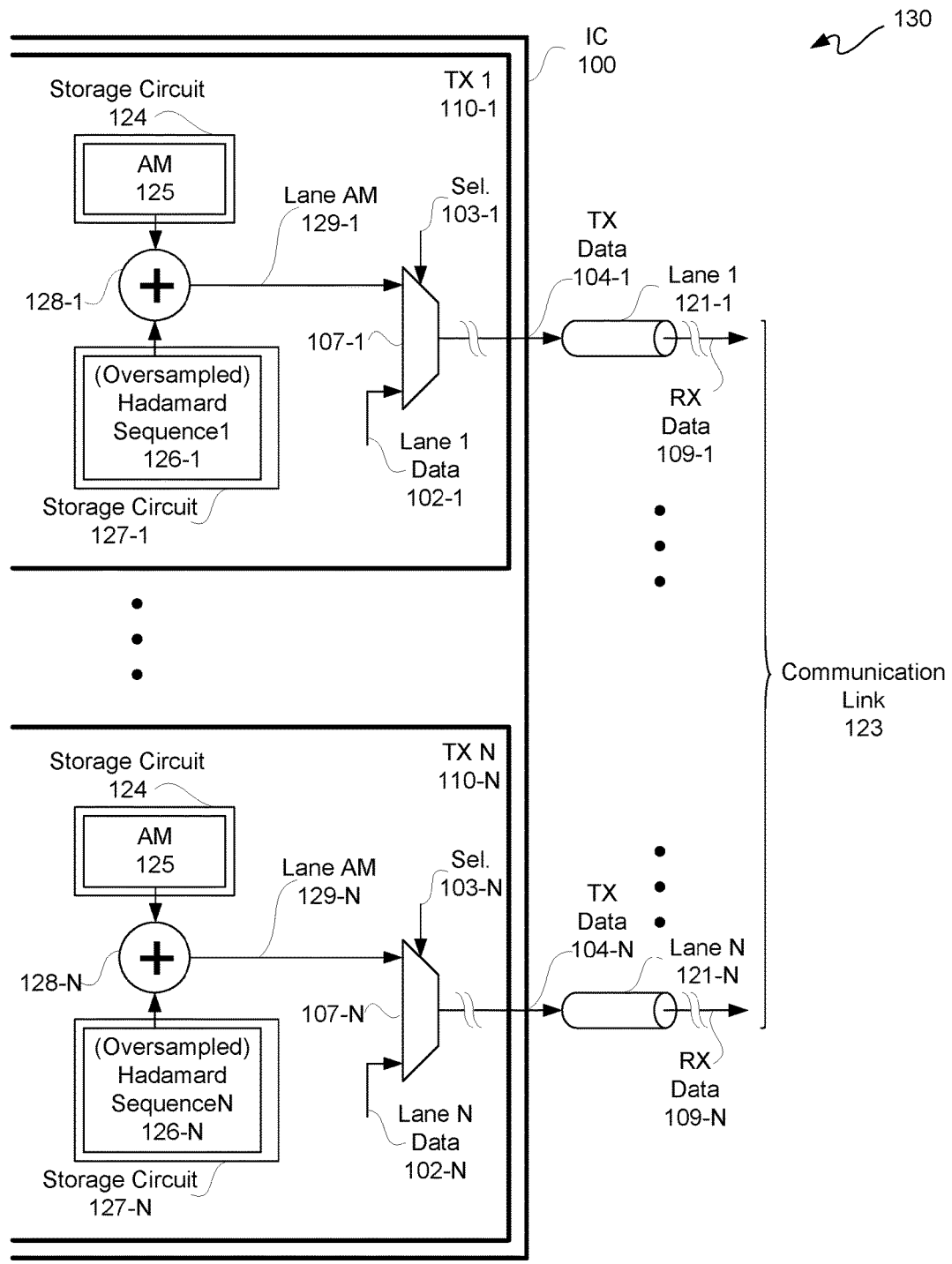
FIG. 3A is a schematic diagram illustratively depicting an exemplary transmission side of a communication system.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

Generally, inter-lane skew is due to propagation delay differences between physical lanes due to internal and/or external differences in physical media (e.g., wire or optical lines) used to carry data for a physical lane. Circuitry for deskewing multiple physical lanes, finding a correct alignment of data such physical lanes contain, and reordering virtual data streams to reconstruct information sent by a transmitter may all be operations performed by a receiver.

To facilitate data alignment and deskew processes, conventionally communication specifications, such as in 802.3 Ethernet, FibreChannel, and other communication specifications, have a transmitter configured to insert periodic alignment markers in a data stream. A receiver can correlate incoming data streams against predefined marker patterns in order to find common points of reference. For example, if there are N physical lanes in a communication system, N corresponding alignment markers may be used and N corresponding correlators for rapid alignment. Moreover, for example, if each of such N physical lanes can carry any one or more of M virtual lanes, then each receiver physical lane may employ an additional M correlators for virtual markers. Thus, the number of correlators may grow as the product of N multiplied by M.

Because conventional receivers are not scalable for large values of N, conventionally a "double-size" alignment marker is transmitted. Such a "double-size" alignment marker conventionally is formed from two parts: a "common" part and a "unique" part. A "common part" is provided on all N physical lanes. A receiver may be configured to look only for the common part, and use each such common part in order to find each lane's position to perform deskew operations for physical lane-to-physical lane data alignment. However, such common part provides no indication for which lane number a common part was obtained.

A "unique part" is provided for identification of each virtual lane. A receiver may be configured to extract each unique part from each virtual lane in order to identify and re-order virtual lanes with respect to one another and recover transmitted data. Having "double-size" alignment markers reduces implementation complexity of an alignment detection operation; however, correlation to N common parts for N physical lanes still involves N correlators for rapid alignment. While virtual lane identification is still complex with "double-size" alignment markers, virtual lane identification need not be performed in real time in contrast to physical lane detection.

There are many design constraints that limit construction of conventional alignment markers. One concern in modern communication systems design is that of lane multiplexing, wherein multiple physical lanes may in fact be multiplexed together by means of a higher-order encoding and multilevel signaling. However, when this multiplexing is conventionally implemented, a common alignment marker pattern may introduce an undesirable droop in clock content of line-coded data under some common circumstances and assumptions.

As described below in additional detail, alignment markers using orthogonal sequences may be associated with corresponding lanes. While these lanes may be virtual lanes, physical lanes, or a combination of virtual lanes on physical lanes, the following description is in terms of physical lanes for purposes of clarity, as implementation for virtual lanes or a combination of virtual lanes and physical lanes follows from the following description.

Moreover, it will be appreciated from the following description that a conventional common marker is not implemented. Rather, a basis alignment marker may be linearly combined, such as by exclusive disjunction, with one or more orthogonal sequences. Not only may the above-described limitation of use of a common alignment marker be eliminated or reduced by avoiding sending both a common marker as well as a unique marker, the number of bits communicated may be reduced which represents a reduction in bandwidth used for overhead, namely more bandwidth may be made available for payload data or other data to be carried.

With the above general understanding borne in mind, various configurations for a communication system and operation thereof are generally described below.

FIG. 1A is an equation diagram for a well-known general equation 10 for a Hadamard matrix, H, 15 for k a positive integer equal to or greater than 1, where term 12 of Hadamard matrix 15 is an inversion of term 13 of Hadamard matrix 15. Each row of a Hadamard matrix may be thought of as a sequence of bits, where rows of a Hadamard matrix are orthogonal to one another and have equal numbers of binary ones ("1s") and binary zeros ("0s"), except for the first row of a Hadamard matrix.

In the following description of construction of alignment markers, a "basis" sequence is used. By "basis" sequence, it is generally meant a sequence which can be generated using at least a part of a pseudo-random binary sequence ("PRBS") or other pseudo-random pattern that yields a suitable amount of transitions in a string of binary digits for delineation from data within a data stream. Such a basis sequence may, though need not, be DC balanced, namely contain as many binary ones as binary zeros in such a basis sequence.

Moreover, in the following description of construction of alignment markers, a set of orthogonal sequences is used in addition to a basis sequence. Along those lines, such a set of orthogonal sequences may include N orthogonal sequences corresponding to N physical lanes. Though rows of a Hadamard matrix are used as a set of orthogonal sequences, or more specifically a set of Hadamard sequences, having orthogonality with respect to one another, in another implementation another type of orthogonal sequence may be used.

FIG. 1B is a matrix diagram illustratively depicting an exemplary Hadamard matrix ("H(16)") equation 10 following from FIG. 1A for 16 rows. Though the following description is in terms of a H(16) matrix 15, namely a 16×16 Hadamard matrix for k=4, other values of k, or more generally a matrix of another size having orthogonal sequences, may be used in another implementation. Moreover, even though the following example is for a power of two number of physical lanes, namely N=16, another number of physical lanes may be used. Furthermore, unused orthogonal sequences can be discarded in an implementation. For purposes of clarity by way of example and not limitation ("non-limiting example"), a 20-physical lane interface may use the first or any 20 rows of an H(32) matrix 15 and discard the 12 remaining unused rows.

There is no non-orthogonality between any two rows in a Hadamard matrix 15, as each row is orthogonal with respect to every other row in such matrix. This allows each row providing a Hadamard sequence to provide a uniquely identifiable sequence for linear combination, as described below. Again, even though the following description is for physical lanes, as the following description is for a real time identification of physical lanes, the following description likewise applies to virtual lanes or a combination of physical and virtual lanes. Therefore, for purposes of generality, the terms "lanes" or "lane" is use to refer to either or both a physical lane and a virtual lane.

FIG. 2 is a flow-block diagram illustratively depicting an exemplary output sequence generation flow 120. A basis alignment marker ("AM") 125 is obtained for input to an exclusive disjunction operator 128. Exclusive disjunction in this implementation may be a modulo 2 addition, which may be implemented as an exclusive-OR gate ("XOR") 128. AM 125 may be added modulo 2 with an orthogonal sequence, such as a Hadamard sequence 126 as in this example. An output port 101 of XOR gate 128 may be used to source an output sequence 129 resulting from modulo 2 addition of AM 125 and Hadamard sequence 126. In this implementation, output sequence 129 is used as a lane alignment marker ("AM"), as described below in additional detail.

In this example, AM 125 is longer than 16 bits. More particularly, in this example implementation, AM 125 is a 64-bit long binary sequence, which is all or a portion of a PRBS. Length of an AM 125 may vary from application-to-application, and so other lengths may be used in other implementations. However, the amount of space available for alignment markers in a transmission, as alignment markers do consume bandwidth, may be relevant to size of an alignment marker in an implementation.

Because AM 125 is longer than an H(16) matrix 15 orthogonal sequence, such as the 16-bits of an orthogonal sequence (e.g., Row 2) of H(16) matrix 15 for example, such orthogonal sequence may be oversampled to match the length of AM 125. Along those lines, each row in H(16) matrix 15 may be oversampled to provide oversampled orthogonal sequences from rows of H(16) matrix 15, such as expanded or oversampled Hadamard sequences. Along those lines, Hadamard sequence 126 may be an oversampled or otherwise expanded Hadamard sequence ("oversampled Hadamard sequence") 126. In this example, each bit in each row of H(16) matrix 15 is repeated a fixed number of times, which in this example is a oversampling factor of four, in order for each oversampled row to match the length of a basis AM 125 sequence. Moreover, by repeating each bit a fixed number of times, a Hadamard sequence may be more reliably decoded with soft decisions, as repeated bits may be less susceptible to error due to noise or other perturbation.

Effectively, by linearly combining a basis AM 125 with a Hadamard sequence 126 or an oversampled Hadamard sequence 126, a basis AM sequence is modulated with a binary XOR operation to yield a lane AM. Each row of a Hadamard matrix 15 may be linearly combined by exclusive disjunction with the same basis AM 125. More particularly, in this example, each oversampled sequence formed of corresponding rows of a Hadamard matrix 15 may be XORed with a same basis AM 125 to provide multiple lane alignment markers ("AMs"). For convenience, each row, such as rows 1-16, may be correspondingly assigned to lanes 1-16; however, sequential ordering of Hadamard matrix rows to lanes is not necessary, as some other assignment may be used.

FIG. 3A is a schematic diagram illustratively depicting an exemplary transmission side of a communication system 130. Communication system 130 may include an integrated circuit ("IC") having one or more transmitter circuits, such as transmitters 110-1 through 110-N, for N lanes for transmission of TX data 104-1 through 104-N having corresponding orthogonal sequences ("lane AMs") 129, namely lane AMs 129-1 through 129-N. Such at least one transmission circuit 110 may be configured to provide at least one output alignment marker 129 representing an exclusive disjunction of at least one orthogonal sequence 126 and an input alignment marker 125. A select circuit, such as at least one multiplexer 107, may be for multiplexing such at least one output alignment marker 129 with payload data 102 for transmission via a communication lane of a plurality of communication lanes 121 of a communication link 123. Such at least one transmission circuit 110 may include at least one storage circuit 127, as described below in additional detail.

Continuing the above example for N equal to 16, though another number of lanes may be used in other implementations, each of transmitters 110-1 through 110-N may be coupled to a same storage circuit 124 having stored therein an AM 125 commonly used by all transmitters 110. However, in another implementation, each of transmitters 110-1 through 110-N may have a separate storage circuit 124 for storing copies of AM 125.

Each of transmitters 110-1 through 110-N may include a corresponding storage circuit 127-1 through 127-N for storing Hadamard sequences or oversampled Hadamard sequences 126-1 through 126-N. Hadamard sequences 126-1 through 126-N may correspond to 16 rows of an H(16) matrix 15, as previously described. In this example, storage circuit 124 may be a register, such as a shift register for example, and storage circuits 127-1 through 127-N may be corresponding registers, such as shift registers. In this example, data may be processed serially; however, in another example data may be processed in parallel. Along those lines, each register for storage circuit 124 and storage circuits 127-1 through 127-N may have multiple output taps.

Each of transmitters 110-1 through 110-N may include a corresponding exclusive disjunction circuit 128-1 through 128-N configured to receive an orthogonal sequence, namely respectively Hadamard sequences 126-1 through 126-N, and an input alignment maker, namely basis AM 125. Each exclusive disjunction circuit 128-1 through 128-N may be configured to exclusively-OR a corresponding orthogonal sequence input and input AM 125 to provide an output alignment marker corresponding thereto, namely lane AMs 129-1 through 129-N. Thus, exclusive disjunction circuits 128 may be configured to receive a common input alignment marker and respectively receive orthogonal sequences to respectively exclusively-OR each of such orthogonal sequences with such input alignment marker to provide corresponding output alignment markers respectively for a plurality of communication lanes.

Lane AMs 129-1 through 129-N may be data inputs to corresponding select circuits 107-1 through 107-N. Other data inputs to select circuits 107-1 through 107-N may be payload and other data for each lane, namely lane 1 data 102-1 through lane N data 102-N. Control select signals 103-1 through 103-N may be provided to select circuits 107-1 through 107-N, respectively, for multiplexing lane AMs 129-1 through 129-N into lane 1 data 102-1 through lane N data 102-N, respectively, for transmission as transmission data 104-1 through 104-N, respectively.

Transmission data 104-1 through 104-N may be sent via lanes 121-1 through 121-N of a communication link 123. In this example, lanes 121-1 through 121-N may correspond to hardwired physical lines, whether wire or optical fiber for example, for communication of data over distance, which transmitted data 104-1 through 104-N may be received by another IC having one or more receivers as received data 109-1 through 109-N, respectively. Depending on topology, some or all physical lanes of a physical interface may be used at the same time. However, if at least two physical lanes are used at a time, then lane AMs 129 may be used as described herein for distinguishing as between such physical lanes. Again, even though the example of physical lanes for real time identification thereof is used, virtual lanes or a combination of virtual and physical lanes may be used. Along those lines, the same circuitry may be repeated and/or expanded for identification of AMs for virtual lanes or a combination of virtual and physical lanes.

Figure 3B:
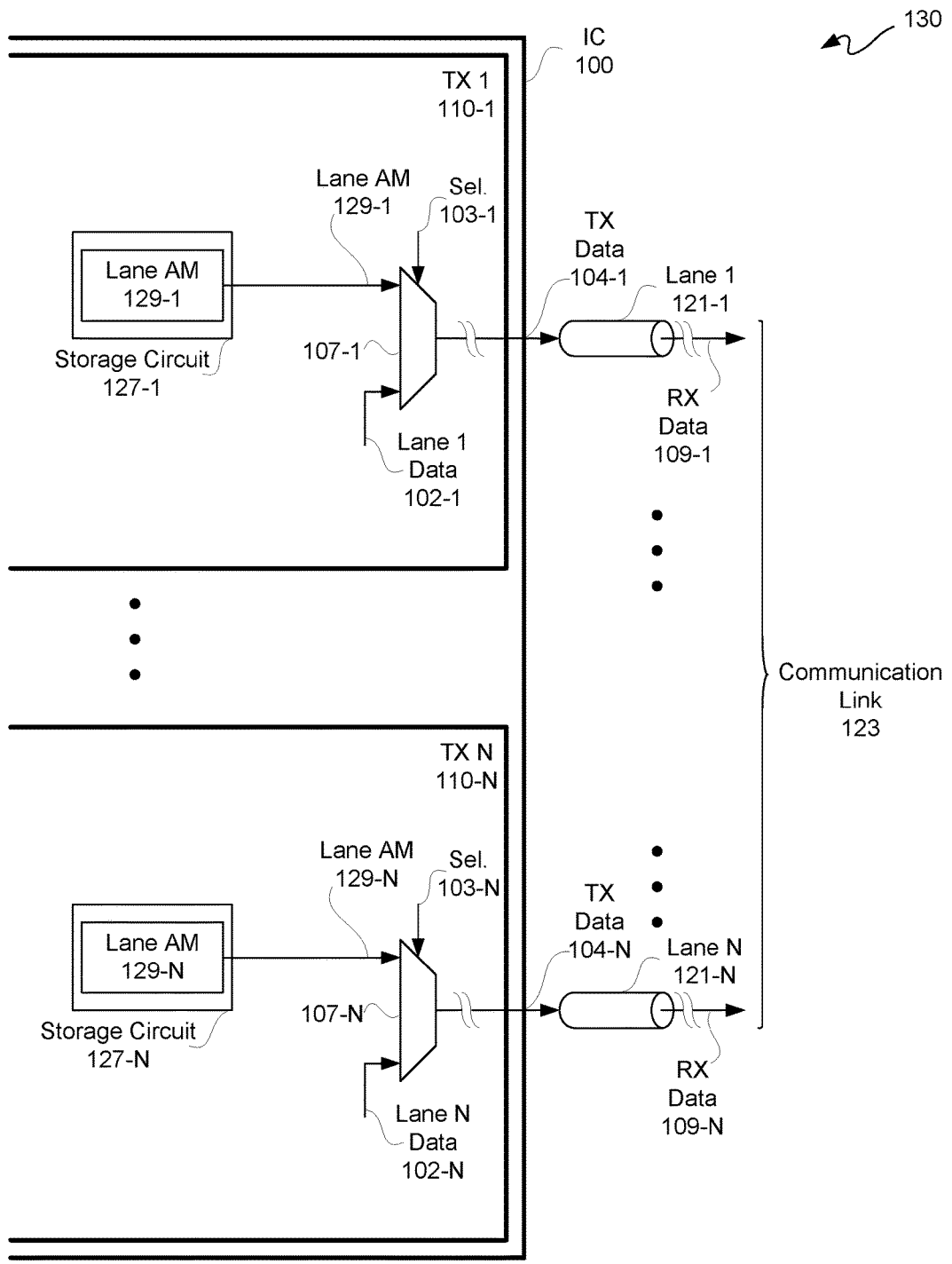
FIG. 3B is a schematic diagram illustratively depicting another exemplary transmission side of a communication system.

FIG. 3B is a schematic diagram illustratively depicting another exemplary transmission side of a communication system 130. The example of FIG. 3B is similar to the example of FIG. 3A, and so only the differences are described below for purposes of clarity and not limitation.

In FIG. 3B, each of transmitters 110-1 through 110-N includes a corresponding storage circuit 127-1 through 127-N. Thus, in this example, each transmitter 110-1 through 110-N may include a single storage circuit for effectively storing a basis AM and a corresponding orthogonal sequence exclusive disjunction result, namely lane AMs 129-1 through 129-N, as both may be fixed values.

Each of these storage circuits 127-1 through 127-N may be a random access memory. Storage circuits 127-1 through 127-N may each store and read out lane AMs 129-1 through 129-N corresponding to Hadamard sequences 126-1 through 126-N, respectively, each added modulo 2 with a basis AM 125. Again, such Hadamard sequences 126-1 through 126-N may be oversampled sequences. In another implementation, a multi-read port random access memory ("RAM") may be used to read out more than one lane AMs 129 at a time, and thus a storage circuit 127 may be shared among multiple transmitter circuits 110.

Each lane AM 129-1 through 129-N may be read out in parallel from storage circuits 127-1 through 127-N, respectively. Thus, lane AMs 129-1 through 129-N, as well as payload and other lane data 102-1 through 102-N, may be parallel data which may be converted to serial data downstream in corresponding transmitters for subsequent transmission.

The remainder of the description of FIG. 3B is the same as that for FIG. 3A, and thus is not repeated for purposes of clarity and not limitation.

Figure 3C:
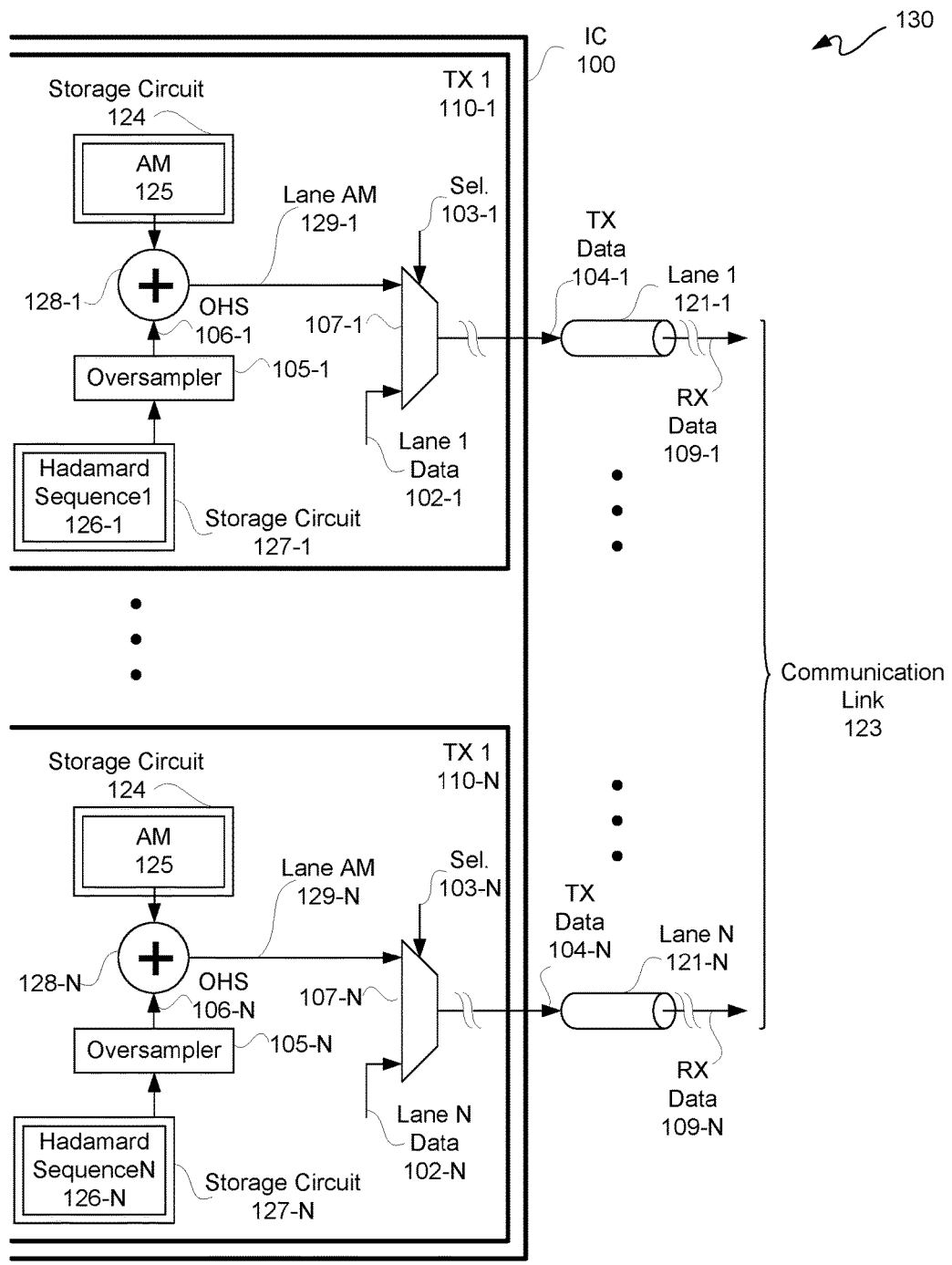
FIG. 3C is a schematic diagram illustratively depicting yet another exemplary transmission side of a communication system.

FIG. 3C is a schematic diagram illustratively depicting yet another exemplary transmission side of a communication system 130. The example of FIG. 3C is similar to the example of FIG. 3A, and so only the differences are described below for purposes of clarity and not limitation.

Continuing the above example for N equal to 16, though another number of lanes may be used in other implementations, each of transmitters 110-1 through 110-N may be coupled to a same storage circuit 124 having stored therein an AM 125 commonly used by all transmitters 110. However, in another implementation, each of transmitters 110-1 through 110-N may have a separate storage circuit 124 for storing copies of AM 125.

Each of transmitters 110-1 through 110-N may include a corresponding storage circuit 127-1 through 127-N for storing Hadamard sequences 126-1 through 126-N, generally Hadamard sequences. Hadamard sequences 126-1 through 126-N may correspond to 16 rows of an H(16) matrix 15, as previously described. In this example, storage circuit 124 may be a register, such as a shift register for example, and storage circuits 127-1 through 127-N may be corresponding registers, such as shift registers. In this example, data may be processed serially; however, in another example data may be processed in parallel. Along the lines of a parallel implementation, each register for storage circuit 124 and storage circuits 127-1 through 127-N may have multiple output taps.

Each of transmitters 110-1 through 110-N may include corresponding oversamplers 105-1 through 105-N and exclusive disjunction circuits 128-1 through 128-N. Oversamplers 105-1 through 105-N may be coupled to respectively receive Hadamard sequences 126-1 through 126-N from storage circuits 127-1 through 127-N. Oversamplers 105-1 through 105-N may be configured to oversample each bit of a corresponding Hadamard sequence in order to oversample Hadamard sequences 126-1 through 126-N, respectively, to correspondingly provide oversampled Hadamard sequences 126-1 through 126-N, each of which is labeled as an oversampled Hadamard sequence ("OHS"), namely oversampled Hadamard sequences 106-1 through 106-N, for purposes of clarity.

Exclusive disjunction circuits 128-1 through 128-N may be configured to respectively receive oversampled Hadamard sequences 106-1 through 106-N, and an input alignment maker, namely basis AM 125. Each exclusive disjunction circuit 128-1 through 128-N may be configured to exclusively-OR a corresponding orthogonal sequence input and input AM 125 to provide an output alignment marker corresponding thereto, namely lane AMs 129-1 through 129-N. Thus, exclusive disjunction circuits 128 may be configured to receive a common input alignment marker and respectively receive orthogonal sequences to respectively exclusively-OR each of such orthogonal sequences with such input alignment marker to provide corresponding output alignment markers respectively for a plurality of communication lanes. In this implementation, exclusive disjunction circuits 128 may be a plurality of exclusive-OR gates configured to respectively exclusively-OR oversampled Hadamard sequences 106 with a common input basis AM 125, where storage circuit 124 is configured to provide such basis AM 125 to each of such exclusive-OR gates.

In this example, the oversampling factor of each of oversamplers 105-1 through 105-N is four, such that each bit of respective Hadamard sequences 126-1 through 126-N is effectively repeated four times, such as by oversampling, for output of a grouping of such four repeats or samples, followed by oversampling of a next bit in a sequence four times for output of another grouping of such four samples, until all bits in a Hadamard sequence have been oversampled.

In each of the above examples, input alignment marker, namely a basis AM 125, and each of Hadamard sequences 126 are all constant values. Moreover, each oversampled Hadamard sequence 126 is a constant value, and an oversampled Hadamard sequence 126 with a constant oversampling factor is likewise a constant value. Each transmitter circuit to the left of a corresponding transmission line may be configured to perform the above-described operations to correspondingly provide TX data 104-1 through 104-N having corresponding orthogonal sequences, namely lane AMs 129-1 through 129-N.

On a receiver-side, each lane may XOR a received signal with the same AM basis 125 used in a transmitter circuit. Generally, a pattern used from AM basis 125 has a sufficient number of transitions for being easy to identify, highly unlikely to be confused with actual data, and highly unlikely to be generated as random data.

When an alignment marker is not present in received data, or is present but not aligned correctly at the then current evaluation position, data at an output of such a receiver-side XOR operation may show no discernable pattern. However, when an alignment marker is present and lined up with the then current evaluation position, such data at an output for such a receiver-side XOR operation may recreate one of such Hadamard sequences or oversampled Hadamard sequences. For purposes of clarity by way of non-limiting example, it shall be assumed that oversampled Hadamard sequences 126 are transmitted, whether by obtaining same from storage or by way of oversampling. Thus, in the above example, one of 16 unique identifiers may be decoded for a lane AM 129 by a receiver.

Figure 4A:
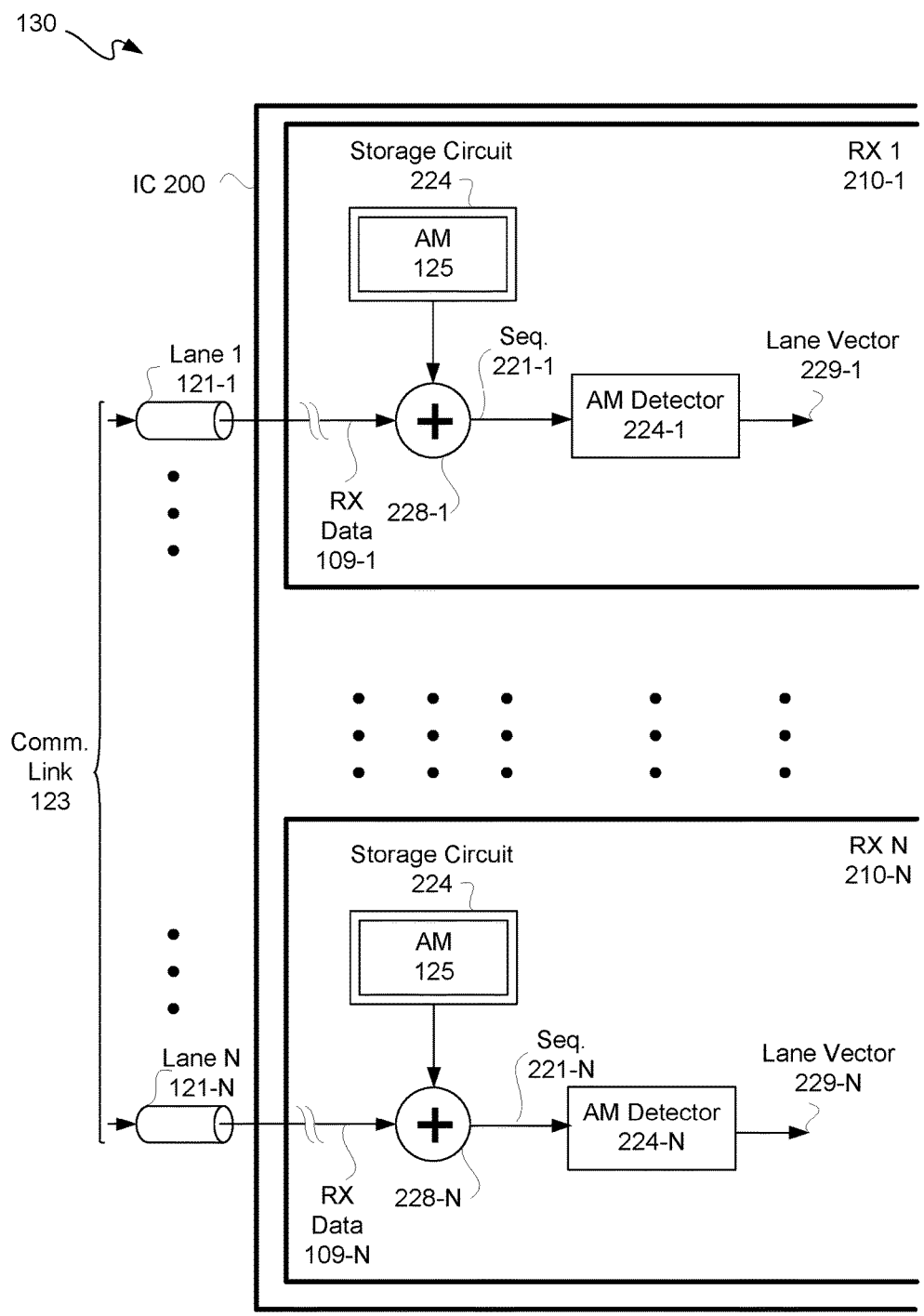
FIG. 4A is a schematic diagram illustratively depicting an exemplary receiver side of a communication system.

FIG. 4A is a schematic diagram illustratively depicting an exemplary receiver side of a communication system 130.

Communication system 130 may include an integrated circuit ("IC") 200 having one or more receiver circuits, such as receivers 210-1 through 210-N, for N lanes for reception of RX data 109-1 through 109-N having corresponding orthogonal sequences 129, namely lane AMs 129-1 through 129-N. Lanes 121-1 through 121-N may be multiplexed together for transmission of data over a communication link 123, or separate physical lines may be used for each of lanes 121-1 through 121-N, or a combination thereof. Again, even though the example of physical lanes for real time identification thereof is used, virtual lanes or a combination of virtual and physical lanes may be used. Along those lines, same circuitry may be repeated or expanded for identification of AMs for virtual lanes or a combination of virtual and physical lanes. Virtual lane identification, which generally does not involve real time processing, may be off-loaded to downstream circuitry from a physical interface.

RX data 109-1 through 109-N may have to be de-skewed and reordered. For example, data 104-1 through 104-N sent on multiple lanes 121-1 through 121-N for a communication link 123 may arrive at a receiver, such as implemented in IC 200, in a jumbled lane order. Thus, a receiver may have to determine which data arrived on which lane. Moreover, data sent on multiple lanes may be out-of-phase with respect to one another due to propagation or other delay differences, and thus a receiver may have to align data sent across multiple lanes.

Continuing the above example for N equal to 16, though another number of lanes may be used in other implementations, each of receiver circuits 210-1 through 210-N may be coupled to a same storage circuit 224 having stored therein an AM 125 commonly used by all receivers 210. However, in another implementation, each of receiver circuits 210-1 through 210-N may have a separate storage circuit 224 for storing copies of AM 125. In an implementation, receiver circuits 210-1 through 210-N may be for one or more receivers, such as multiplexing received data into a single receiver having multiple receiver circuits 210-1 through 210-N. However, for purposes of clarity by way of example and not limitation, it shall be assumed that receiver circuits 210-1 through 210-N are for N respective receivers, where communication link 123 is a single fiber having multiple physical lanes.

Storage circuit 224 is configured to provide an input alignment marker 125 to each of exclusive disjunction circuits 228-1 through 228-N. Exclusive disjunction circuits 228-1 through 228-N, such as XOR gates for example, are configured to respectively receive input data, namely RX data 109-1 through 109-N, from a communication line used for communication link 123. Each exclusive disjunction circuit 128-1 through 128-N is configured to exclusively-OR input alignment marker 125 and corresponding input RX data 109-1 through 109-N to provide corresponding output sequences 221-1 through 221-N. Again, each input RX data 109-1 through 109-N has a corresponding output alignment marker, namely lane AM 129-1 through 129-N respectively, associated with a respective orthogonal sequence.

Output sequences 221-1 through 221-N may respectively be input to AM detectors 224-1 through 224-N of receiver circuits 210-1 through 210-N. AM detectors 224-1 through 224-N may respectively output lane vectors 229-1 through 229-N corresponding to lane AMs 129-1 through 129-N. Each of AM detectors 224-1 through 224-N may include a corresponding soft decision block, as described below in additional detail.

Figure 4B:
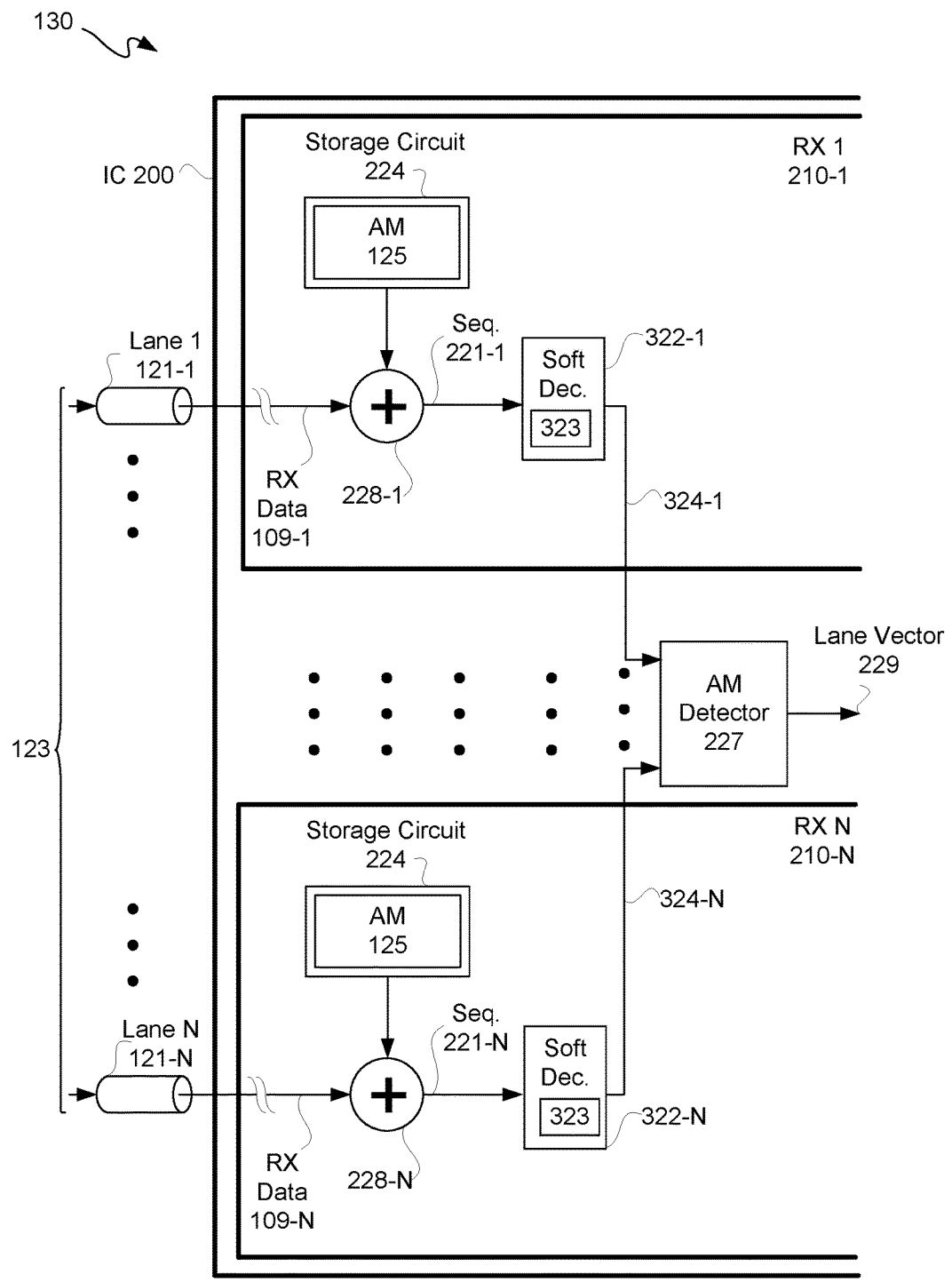
FIG. 4B is a schematic diagram illustratively depicting another exemplary receiver side of a communication system.

FIG. 4B is a schematic diagram illustratively depicting another exemplary receiver side of a communication system 130. As the receiver side of communication system 130 of FIG. 4B is similar to that as in FIG. 4A, only the differences are described below for purposes of clarity and not limitation. Outputs from exclusive disjunction circuits 228-1 through 228-N include XORing with payload data, as well as lane AMs 129-1 through 129-N. Outputs from exclusive disjunction circuits 228-1 through 228-N may be include sequences, such as output sequences 221-1 through 221-N, respectively.

Output sequences 221-1 through 221-N respectively from exclusive disjunction circuits 228-1 through 228-N as previously described may be input to corresponding soft decision blocks 322-1 through 322-N. Each of soft decision blocks 322-1 through 322-N may be configured to receive a corresponding output sequence of output sequences 221-1 through 221-N having orthogonal lane AMs 129-1 through 129-N, respectively.

Soft decision blocks 322-1 through 322-N may be configured to provide corresponding streams of soft-decision values 324-1 through 324-N for such output sequences, respectively. Along those lines, each of soft decision blocks 322-1 through 322-N may include a corresponding accumulator circuit 323, as described below in additional detail.

Continuing the above example of a 16-by-16 Hadamard matrix, there may be 16 soft decisions for each row. Soft-decision values 324-1 through 324-N may be input to an AM detector 227, which is in common or shared among receivers 210-1 through 210-N. AM detector 227 may be configured to produce lane vectors 229 corresponding to detected lane AMs 129.

Figure 5A:
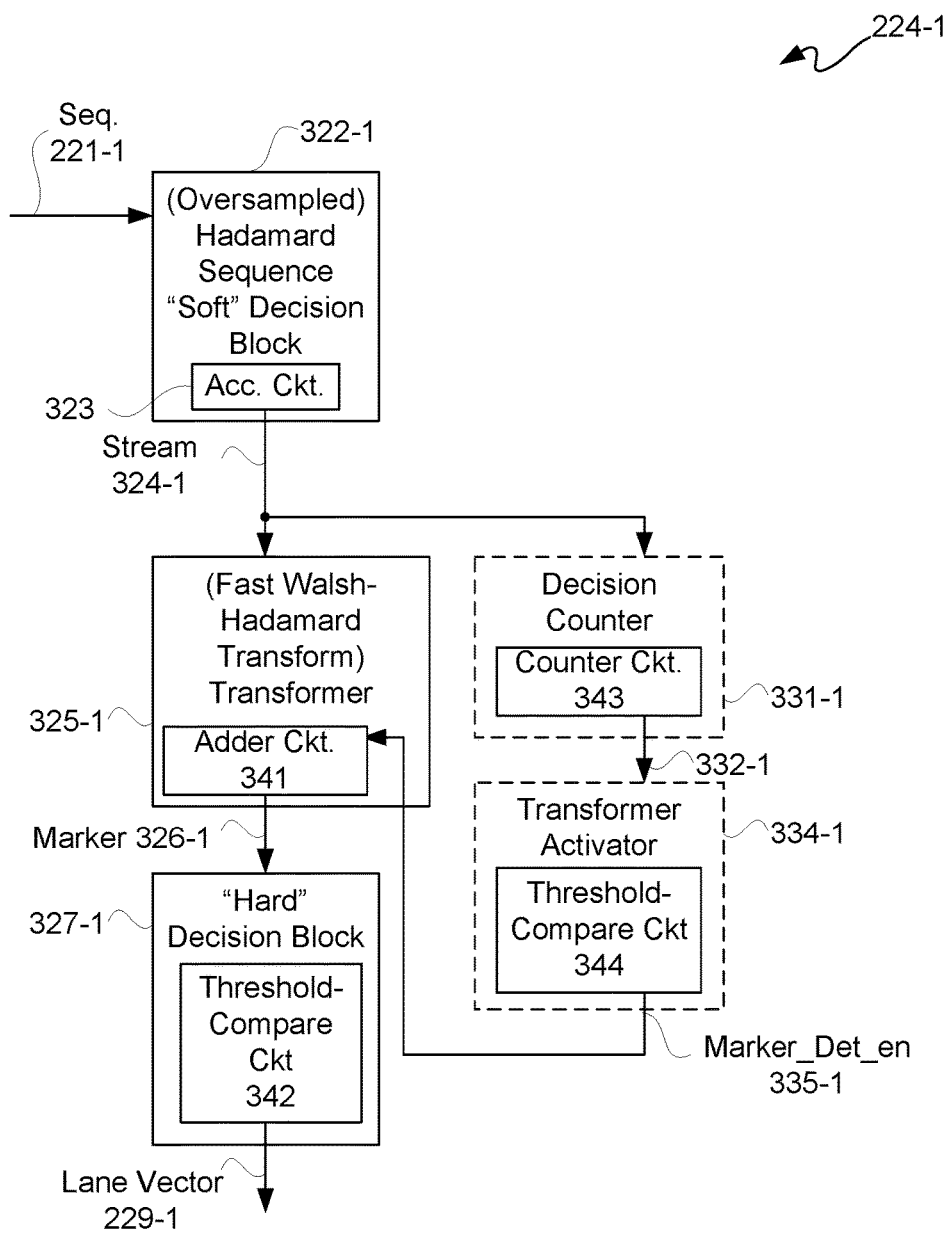
FIG. 5A is a schematic diagram illustratively depicting an exemplary alignment marker ("AM") detector, such as may be used in the exemplary receiver of FIG. 4A.

FIG. 5A is a schematic diagram illustratively depicting an exemplary AM detector 224-1, such as may be used in exemplary receiver 210-1 of FIG. 4A. Each of AM detectors 224-1 through 224-N may be configured the same, and so only AM detector 224-1 is described in detail for purposes of clarity. With simultaneous reference to FIGS. 4A and 5A, AM detector 224-1 is further described.

AM detector 224-1 can be a serial (sequential) or parallel data implementation. Output from exclusive disjunction circuits 228, namely exclusive disjunction circuit 228-1 for this example, may recreate one of the N oversampled Hadamard sequences transmitted, apart from payload data transmitted, along with lane AMs 129. For purposes of clarity by way of example and not limitation, this is called an output sequence 221-1 even though XORing with received payload data may not produce any discernable pattern associated with an orthogonal sequence for a lane number.

Output sequence 221-1 is input to a Hadamard sequence "soft" decision block 322-1. In this exemplary implementation, soft decision block 322-1 is configured for an oversampled Hadamard sequence; however, in another implementation, another type of orthogonal sequence, oversampled or not, may be used. Soft-decision block 322-1 may be configured with an accumulator circuit 323 to accumulate bit values of an oversampled Hadamard sequence, as well as payload data, to provide a stream of soft-decision values 324-1. By "soft" decision, it is generally meant a value generally associated with a probability.

For this example implementation, Hadamard sequence "soft" decision block 322-1 may collect repeated bits in groups according to an oversampling factor, such as previously described. For example, if a 1111 bit pattern is seen in output sequence 221-1 by "soft" decision block 322-1 for an oversampling factor of 4, "soft" decision block 322-1 may interpret this as a logic 1 in a Hadamard sequence, namely such a Hadamard source sequence likely had a logic 1 at the corresponding location to such 1111 received. If, for example, a 0000 bit pattern is seen in output sequence 221-1 by "soft" decision block 322-1 for an oversampling factor of 4, "soft" decision block 322-1 may interpret this as a logic 0 in a Hadamard sequence, namely such a Hadamard source sequence likely had a logic 0 at the corresponding location to such 0000 received. If a value other than either 1111 or 0000 for an oversampling factor of 4 is received by "soft" decision block 322-1, then any one or more erroneous bit states could be due to an alignment marker not being present, not being correctly aligned, or having been corrupted by noise.

Examples of groups with at least one erroneous bit state may include 0101 and 1000, among others, for an oversampling factor of 4. For these or other groups of bits, "soft" decision block 322-1 can register an "erasure" for each location suspected of having an erroneous bit state. For example, for an oversampling factor of 4, a received sequence 221-1 of 0000111101110000 may be reduced to a soft value of 01x0, where x represents an erasure, corresponding to such received sequence. Such soft value may be output by "soft" decision block 322-1 as a soft decision in a stream of soft-decision values 324-1. Accumulator circuit 323 may be configured to produce soft values as described herein.

A "soft" marker value may be associated with a probability for a row, and such "soft" marker value may be output from a transform block ("transformer"), such as transformer 325-1, in response to one or more soft decision values obtained from a stream of soft-decision values 324-1. Transformer 325-1 may be configured to receive a stream of soft-decision values 324-1 and transform values of such stream of soft-decision values 324-1 into a soft-decision marker 326-1. In this example, transformer 325-1 is configured with a Walsh-Hadamard Transform ("WHT"). More particularly, in this example transformer 325-1 is configured with a Fast WHT ("FWHT"). However, in another implementation, another transform may be used for transforming orthogonal sequences, as described herein.

Soft-decision marker 326-1 may be a "soft value", namely a probability related value. However, if no clear value, e.g. middling values, are output by transformer 325-1, then transformer 325-1 may possibly be processing information associated with payload data and not a lane AM. Effectively, transformer 325-1 by performing a transform outputs a value indicating a probability to a correlation to a row in a Hadamard matrix.

Generally, transformer 325-1 may: not be receiving information for a lane AM; be receiving information for a lane AM but such information is not properly aligned; or be receiving information for a lane AM and such information is properly aligned. When an alignment marker is not present, or is present but not aligned correctly at the then current evaluation position, data at the output of an XOR operation, namely output sequence 221-1 from exclusive junction circuit 228-1, does not have a discernable pattern for detection by AM detector 224-1, and thus by transformer 325-1.

However, when an alignment marker is present and lined up with the then current evaluation position, which may be a fixed position, data at the output of an XOR operation, namely output sequence 221-1 from exclusive junction circuit 228-1, does have a discernable pattern for detection by AM detector 224-1. More particularly, for this example, when an alignment marker is present and lined up with the then current evaluation position, data at the output of an XOR operation, namely output sequence 221-1 from exclusive junction circuit 228-1, may be a recreation of an oversampled Hadamard sequence assigned to a numbered lane of a plurality of communication lanes. Accordingly, for such an aligned condition, output of an FWHT for such a sequence is a number corresponding to a row in a Hadamard matrix from which such oversampled Hadamard sequence was oversampled. Thus, by condensing an oversampled Hadamard sequence to a Hadamard sequence, a FWHT may transform such Hadamard sequence into a vector for a lane for an aligned condition.

Along those lines, optionally accumulator circuit 323 may be configured to code soft decisions output as a stream of soft-decision values 324-1. For example, accumulator circuit 323 may include combinatorial logic configured to encode a +1 for each binary 1 in a soft decision, −1 for each binary 0 in a soft decision, and 0 for each erasure in a soft decision. With this coding, a lane identifier, namely an indication of which alignment marker from a set of alignment markers has been received, can be recovered by subjecting soft decision data to a transform operation by a FWHT.

A FWHT is a well-known arithmetic algorithm, which may be implemented with an adder circuit 341, including without limitation adders and subtractors only, as such algorithm uses only additions and subtractions of complexity $N*\log(N)$. In this implementation, output of an FWHT configured transformer 325-1 may be a vector of numbers representing the correlation of a received sequence with each candidate sequence in a source Hadamard matrix.

A hard-decision block 327-1 may be configured to receive soft-decision marker 326-1 and provide a hard-decision, namely a lane vector 229-1, for such soft-decision marker. Such a lane vector 229-1 may be for a communication lane of a plurality of communication lanes 121 of a communication link 123. Each output soft decision marker 326-1 from transformer 325-1 can be compared by hard-decision block 327-1 against a threshold, such as by a threshold-compare circuit 342, to determine the most likely lane identification corresponding to associated encoded bits received.

Hard-decision block 327-1 may be implemented as a comparator with a threshold input for comparison with soft-decision marker 326-1. Because Hadamard sequences are by definition orthogonal to one another, likelihood of mistaking one lane AM for another lane AM is so low as to be highly improbable. Accordingly, a high probability threshold may be used for each comparison. For example, exact values for rows may be used for each comparison, with only one exact match being output as a lane vector 229-1.

As previously stated, not all of output sequence 221-1 is actually a sequence, or at least a discernable pattern, for purposes of lane AM detection. Accordingly, to avoid transforming each set of soft decisions from a stream of soft decisions 324-1, optionally a decision counter 331-1 and a transformer activator block 334-1 may be added.

Along those lines, decision counter 331-1 may be configured to receive a stream of soft decisions 324-1 from soft decision block 322-1, such as from accumulation circuit 323. Using the above coding scheme, accumulator circuit 323 may encode a +1 for binary 1 in a soft decision, −1 for binary 0 in a soft decision, and 0 for an erasure in a soft decision for input into a FWHT of transformer 325-1 and into a decision counter 331-1.

Decision counter 331-1 may be configured with a counter circuit 343 to count erasures. Accumulated counts from counter circuit 343 may be output as a stream of counts 332-1 to transformer activator 334-1, which may be implemented as a threshold-compare circuit 344. Such accumulated counts may be for a number of bits, as may vary from implementation to implementation. If an accumulated count of erasures is too high to indicate an oversampled Hadamard sequence as in this example is output as output sequence 221-1 after being condensed into soft decisions, then a threshold of a threshold compare circuit 344 may not be exceeded or met. For such a condition, a marker detection activation signal ("Marker_Det_en") 335-1 is not asserted to transformer 325-1, such as may be implemented with an adder circuit 341. In this state, transformer 325-1 is suspended from operating to perform an FWHT as in this example implementation.

If, however, an accumulated count, namely a detected value in a stream of counts 332, of erasures meets or exceeds a threshold of a threshold compare circuit 344 to indicate an oversampled Hadamard sequence as in this example is output as output sequence 221-1 after being condensed into soft decisions, then for such a condition marker detection activation signal 335-1 is asserted to transformer 325-1, such as may be implemented with an adder circuit 341. In this state, transformer 325-operates to perform an FWHT on a then current stream of soft decisions 324-1 as in this example implementation.

In order not to miss any portion of a lane AM and/or for some line noise tolerance, a threshold of transformer activator 334-1 may be sufficiently low as to activate adder circuit 341 prior to an exact alignment. In such a pre-alignment state, no lane vector 229-1, or at least no valid lane vector 229-1, may be output from threshold-compare circuit 342 due to a soft marker 326-1 not meeting or exceeding a threshold of threshold-compare circuit 342. However, by counting the number of erasures for a grouping of bits, and ensuring such count is less than a certain threshold, an overall match to a lane AM can be output as a lane vector 229-1 with a level of certainty, as may vary from application-to-application depending on noise. In other words, a threshold of threshold-compare circuit 344 allows a false positive match rate to be traded off against tolerance of a system to line noise and to sequence correlation.

After exiting an alignment state, an accumulated count of erasures may again be too high to indicate an oversampled Hadamard sequence as in this example is output as output sequence 221-1 after being condensed into soft decisions. Accordingly, a threshold of a threshold compare circuit 344 may not be exceeded or met for such a condition, and so marker detection activation signal 335-1 may be de-asserted to transformer 325-1, such as may be implemented with an adder circuit 341. In this state, transformer 325-1 may again be suspended from operating to perform an FWHT as in this example implementation.

AM detector 224-1, including optional decision counter 331-1 and transformer activator 334-1, may be implemented with little more circuitry overhead than some conventional correlation algorithms. However, AM detector 224-1, in contrast to conventional correlation algorithm implementations, may be used for correlating against multiple AMs, rather than just one common AM. Accordingly, a number of lanes may be assigned different lane AMs for correlation. In other words, a set of bit patterns may be generated for use as AMs in a multi-lane communication interface, and a circuit architecture may be implemented, such as described herein, for efficiently detecting and telling apart such AMs. In addition to being able to multiplex multiple communication lanes together, such multiplexing may be performed without incurring a loss of clock content as in conventional communication systems.

Figure 5B:
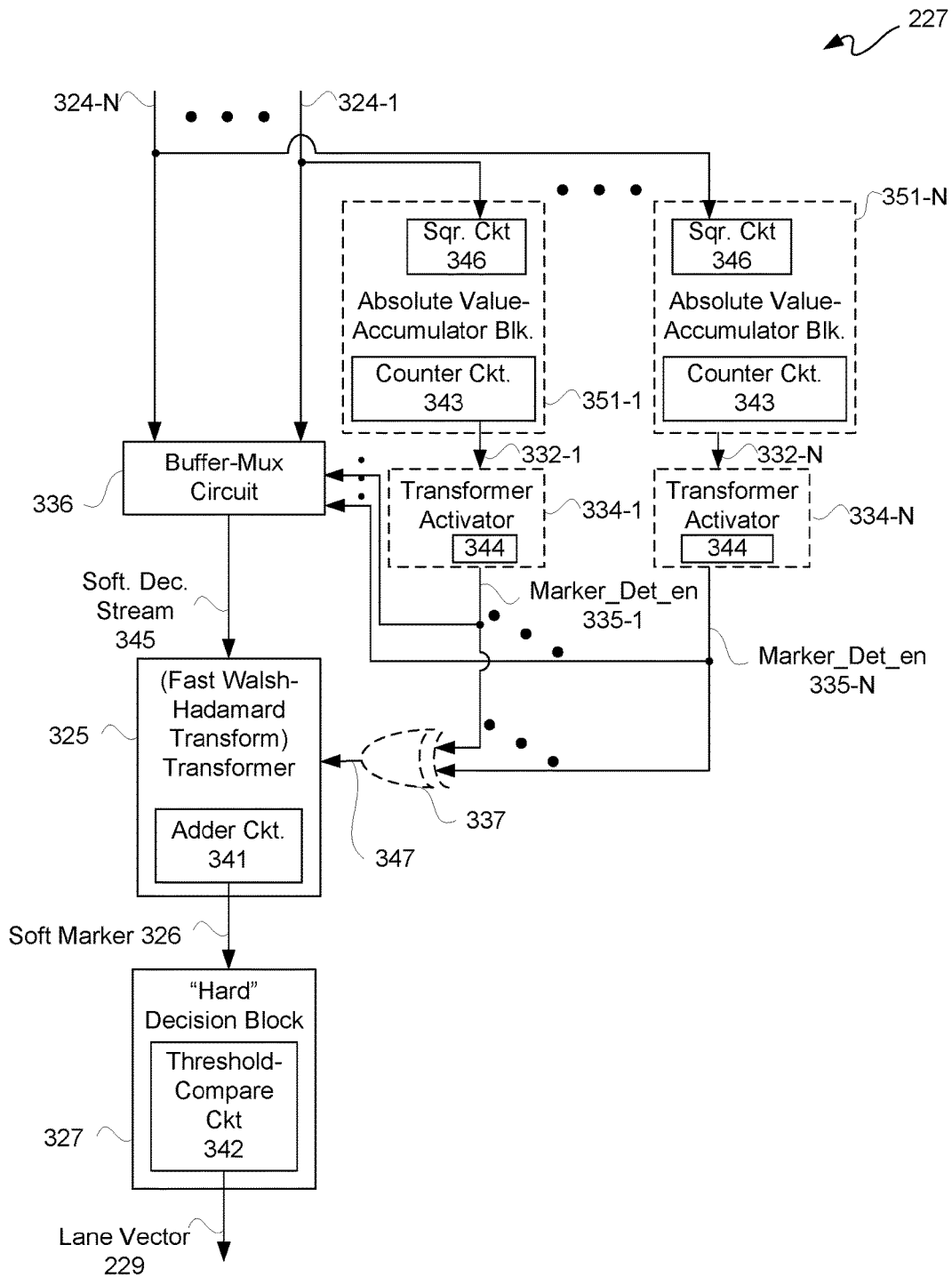
FIG. 5B is a schematic diagram illustratively depicting another exemplary AM detector, such as may be shared for use by the exemplary receivers of FIG. 4B.

In order to further reduce overhead while taking advantage of such lane multiplexing capability, a common AM detector 227 may be used as illustratively depicted in FIG. 4B. Along those lines, FIG. 5B is a schematic diagram illustratively depicting an exemplary AM detector 227, such as may be shared for use by exemplary receivers 210-1 through 210-N of FIG. 4B. With simultaneous reference to FIGS. 4B and 5B, AM detector 227 is further described.

AM detector 227 can be a serial (sequential) or parallel data implementation; however, for operating at higher speed, a parallel data implementation may be used in order to process data for multiple lanes in a timely manner. Output from exclusive disjunction circuits 228, may recreate one of the N oversampled Hadamard sequences transmitted, apart from payload data transmitted along with lane AMs 129. Again, for purposes of clarity by way of example and not limitation, these outputs are called output sequences 221 even though XORing with received payload data may not produce any discernable pattern associated with a corresponding orthogonal sequence for a lane number.

Recall from the above description of FIG. 4B, output sequences 221 are respectively input to Hadamard sequence "soft" decision blocks 322. In this exemplary implementation, soft decision blocks 322 are each configured for an oversampled Hadamard sequence; however, in another implementation, another type of orthogonal sequence, oversampled or not, may be used. Soft-decision blocks 322 may each be configured with a corresponding accumulator circuit 323 to accumulate bit values of an oversampled Hadamard sequence, as well as payload data, to provide corresponding streams of soft-decision values, such as streams of soft-decision values 324-1 through 324-N.

For this example implementation, Hadamard sequence "soft" decision blocks 322 may collect repeated bits in groups according to an oversampling factor, such as previously described. Groupings of bits may be condensed to a binary 1 or 0 by "soft" decision blocks 322 from corresponding output sequences 221, and any one or more erroneous bit states in such corresponding output sequences 221 could be due to an alignment marker not being present, not being correctly aligned, or having been corrupted by noise. For groups of bits with one or more erroneous states, "soft" decision blocks 322 can register an "erasure" for each location suspected of having an erroneous bit state. Soft values may be output by "soft" decision blocks 322 as soft decisions in corresponding streams of soft-decision values 324-1 through 324-N.

A select circuit, which may be implemented as buffer-multiplexer circuit 336, may be configured to receive and buffer each of such streams of soft-decision values 324-1 through 324-N. Buffer-multiplexer circuit 336 may further be configured to receive each of marker detected signals 335 and to select each corresponding stream of soft-decision values responsive to assertion of corresponding ones of marker detected signal 335, as described below in additional detail.

In an implementation, buffer-multiplexer circuit 336 may be configured to sequentially select a soft decisions stream 345 from streams of soft-decision values 324-1 through 324-N for output for a period of time before selecting a next stream in such sequence. Thus, a round-robin selection of output soft decisions streams 345 may be output from buffer-multiplexer circuit 336 over a number of output periods. However, optional circuitry on the right of FIG. 5B may be used to more selectively output each soft decisions stream 345 from streams of soft-decision values 324-1 through 324-N, as described below in additional detail.

A "soft" marker value may be associated with a probability for a row, and such "soft" marker value may be output from a transform block ("transformer"), such as transformer 325, in response to one or more soft decision values obtained from a soft decisions stream 345 output from buffer-multiplexer circuit 336. Transformer 325 may be configured to receive soft decisions stream 345 and transform values of such soft decisions stream 345 into a soft-decision marker 326. In this example, transformer 325 is configured with a WHT. More particularly, in this example transformer 325 is configured with a FWHT. However, in another implementation, another transform algorithm may be used for transforming orthogonal sequences, as described herein.

Soft-decision marker 326 may be a "soft value", namely a probability related value. However, if no clear value, e.g. middling values, are output by transformer 325, then transformer 325 may possibly be processing information associated with payload data and not a lane AM. Effectively, transformer 325, by performing a FWHT, outputs a value indicating a probability to a correlation to a row in a Hadamard matrix.

Generally, transformer 325 may: not be receiving information for a lane AM; be receiving information for a lane AM but such information is not properly aligned; or be receiving information for a lane AM and such information is properly aligned. When a lane AM is not present, or is present but not aligned correctly at the then current evaluation position, data at the output of an XOR operation, namely an output sequence 221 from a corresponding exclusive junction circuit 228, does not have a discernable pattern for detection by AM detector 227, and thus by transformer 325.

However, when a lane AM is present and lined up with the then current evaluation position, which may be a fixed position, data at the output of an XOR operation, namely output sequence 221 from a corresponding exclusive junction circuit 228, does have a discernable pattern for detection by AM detector 227. Again, for this example, when an alignment marker is present and lined up with the then current evaluation position, data at the output of an XOR operation, namely an output sequence 221 from a corresponding exclusive junction circuit 228, may be a recreation of an oversampled Hadamard sequence assigned to a numbered lane of a plurality of communication lanes. Accordingly, for such an aligned condition, output of an FWHT for such a sequence is a number corresponding to a row in a Hadamard matrix from which such oversampled Hadamard sequence was oversampled. Thus, by condensing an oversampled Hadamard sequence to a Hadamard sequence, a FWHT may transform such Hadamard sequence into a vector for a lane for an aligned condition.

Optionally, an accumulator circuit 323 of each of corresponding soft decision blocks 322 may be configured to code soft decisions output as a stream of soft-decision values 324-1 through 324-N, respectively. For example, each such accumulator circuit 323 may include combinatorial logic configured to encode a +1 for each binary 1 in a soft decision, -1 for each binary 0 in a soft decision, and 0 for each erasure in a soft decision. With this coding, a lane identifier, namely an indication of which alignment marker from a set of alignment markers has been received, can be recovered by subjecting soft decision data to a transform operation by a FWHT.

A FWHT is a well-known arithmetic algorithm, which may be implemented with an adder circuit 341, including without limitation adders and subtractors only, as such algorithm uses only additions and subtractions of complexity $N*\log(N)$. In this implementation, output of an FWHT configured transformer 325 may be a vector of numbers representing the correlation of a received sequence with each candidate sequence in a source Hadamard matrix.

A hard-decision block 327 may be configured to receive a soft-decision marker 326 from adder circuit 341 and provide a hard-decision, namely a lane vector 229, for such soft-decision marker. Such a lane vector 229 may be for a communication lane of a plurality of communication lanes 121 of a communication link 123. Each output soft decision marker 326 from transformer 325 can be compared by hard-decision block 327 against a threshold, such as by a threshold-compare circuit 342, to determine the most likely lane identification corresponding to associated encoded bits received.

Hard-decision block 327 may be implemented as a comparator with a threshold input for comparison with soft-decision marker 326. Because Hadamard sequences are by definition orthogonal to one another, likelihood of mistaking one lane AM 129 for another lane AM is so low as to be highly improbable. Accordingly, a high probability threshold may be used for each comparison. For example, exact values for rows may be used for each comparison, with only one exact match being output as a lane vector 229.

As previously stated, not all of an output sequence 221 is actually a sequence, or at least a discernable pattern, for purposes of lane AM detection by AM detector 227. Accordingly, to more dynamically transform each set of soft decisions from a streams of soft decisions 324-1 through 324-N, optionally absolute value accumulators 351-1 through 351-N and corresponding transformer activator blocks 334-1 through 341-N may be added.

Along those lines, absolute value accumulators 351-1 through 351-N may be configured to respectively receive streams of soft decisions 324-1 through 324-N from corresponding soft decision blocks 322-1 through 322-N, such as from respective accumulation circuits 323. Using the above coding scheme, each such accumulator circuit 323 may encode a +1 for binary 1 in a soft decision, -1 for binary 0 in a soft decision, and 0 for an erasure in a soft decision for input into a FWHT of transformer 325 and into absolute value accumulators 351-1 through 351-N.

Absolute value accumulators 351-1 through 351-N may each be configured with an absolute value circuit, such as a magnitude circuit, a squared circuit, or a combination thereof. For purposes of clarity by way of example and not limitation, it shall be assumed that a squared circuit 346 is used. Accordingly, each squared +1 and each squared -1 performed by squared circuit 346 results in a binary 1 output, and each squared 0 performed by squared circuit 346 results in a binary 0 output.

Absolute value accumulators 351-1 through 351-N may each include a counter circuit, such as counter circuit 343, to count erasures, namely binary 0 outcomes of squared circuit 346 for this example of encoding. Each counter circuit 343 may accumulate a number of values from a corresponding stream of soft-decision values to provide a detected value. Accumulated counts from counter circuits 343 may be output as respective streams of counts 332-1 to 332-N to corresponding transformer activators 334-1 through 334-N, which may be implemented with respective threshold-compare circuits 344. Each threshold-compare circuit block may be configured to receive a detected value and compare such a detected value with a threshold value to assert, or not, a corresponding marker detected signal for such detected value meeting or being greater than such threshold value, as previously described with reference to FIG. 5A and not repeated for purposes of clarity.

Such accumulated counts may be for a number of bits, as may vary from implementation-to-implementation. If an accumulated count of erasures is too high to indicate an oversampled Hadamard sequence as in this example is output as output for any of output sequences 221-1 through 221-N after being condensed into soft decisions, then a threshold of a threshold compare circuits 344, which may be a commonly applied threshold to each of such threshold compare circuits 344, may not be exceeded or met. For such a condition as may be determined for any, some or all of corresponding output sequences 221-1 through 221-N, each corresponding marker detection activation of marker detection activation signals 335-1 through 335-N is not asserted as a control select to buffer-multiplexer circuit 336 and not asserted to a logic circuit, such as for example an OR gate 337, as an activation signal 347. If, however, an accumulated count of erasures meets or exceeds a threshold of a threshold compare circuit 344 to indicate an oversampled Hadamard sequence output in any one or more of output sequences 221-1 through 221-N (after being condensed into corresponding soft decisions), then for each corresponding condition, an associated marker detection activation signal of marker detection activation signals 335-1 through 335-N may be asserted as a control select to buffer-multiplexer circuit 336 and a logic circuit, such as for example an OR gate 337, as an activation signal 347.

Along those lines, such one or more asserted marker detection activation signals 335-1 through 335-N provided to buffer-multiplexer circuit 336 may be used to output each corresponding stream of soft decisions 324-1 through 324-N. For more than one asserted marker detection activation signals 335-1 through 335-N, output from buffer-multiplexer circuit 336 may be multiplexed as corresponding streams of soft decisions 324-1 through 324-N to provide soft decision stream 345.

Transformer 325, such as may be implemented with an adder circuit 341 as previously described, may be configured to receive soft decision stream 345 having one or more oversampled Hadamard sequences. In this state, activation signal 347 may be asserted to cause transformer 325 to operate to perform an FWHT on each then current stream of soft decisions 324 in soft decision stream 345 as in this example implementation. Again, transformer 325 may be implemented with an adder circuit 341. If activation signal 347 is not asserted, then there is no soft decision stream 345 to process by transformer, and transformer 325 is suspended from operating.

Output from adder circuit 341 may be one or more soft markers 326 indicating lane numbers for one or more corresponding lanes 121. Such one or more soft markers 326 may be received by a threshold-compare circuit 342 of "hard" decision block 327 to output one or more corresponding lane vectors 229.

In order not to miss any portion of a lane AM and/or for some line noise tolerance, a threshold for transformer activators 334-1 through 334-N may be sufficiently low as to activate adder circuit 341, as well as to select one or more outputs for soft decision stream 345, prior to an exact alignment. In such a pre-alignment state, no lane vector 229, or at least no valid lane vector 229, may be output from threshold-compare circuit 342 due to a soft marker 326 not meeting or exceeding a threshold of threshold-compare circuit 342. However, by counting the number of erasures for a grouping of bits, and ensuring such count is less than a certain threshold, an overall match to a lane AM can be output as a lane vector 229 with a level of certainty, as may vary from application-to-application depending on noise. As previously described, a threshold of threshold-compare circuit 344 allows a false positive match rate to be traded off against tolerance of a system to line noise and to sequence correlation.

After exiting an alignment state, each accumulated count of erasures may again be too high to indicate an oversampled Hadamard sequence as in this example in all of output sequences 221-1 through 221-N after being condensed into soft decisions. Accordingly, a threshold of threshold compare circuits 344 may not be exceeded or met for such a condition in each instance, and so marker detection activation signals 335-1 through 335-1 may all be de-asserted to buffer-multiplexer circuit 336 and to OR gate 337, and thus to adder circuit 341 of transformer 325. In this state, transformer 325 may again be suspended from operating to perform an FWHT as in this example implementation.

AM detector 227, including optional absolute value accumulators 351 and transformer activators 334, may be implemented with little more circuitry overhead than some conventional correlation algorithms. However, AM detector 227, in contrast to conventional correlation algorithm implementations, may be used for correlating against multiple AMs, rather than just one common AM. Accordingly, a number of lanes may be assigned different lane AMs for correlation. In other words, a set of bit patterns may be generated for use as AMs in a multi-lane communication interface, and a circuit architecture may be implemented, such as described herein, for efficiently detecting and telling apart such AMs multiplexed for multiple communication lanes. Again, such multiplexing may be performed without incurring a loss of clock content as in conventional communication systems. Moreover, by sharing a transformer 325 with lane-to-lane circuitry overhead, namely absolute value accumulators 351-1 through 351-N and transformer activators 334-1 through 334-N, which is inconsequential compared with transformer 325 circuitry overhead, a more efficient implementation may be obtained than having a respective transformer 325 for each lane.

Figure 6:
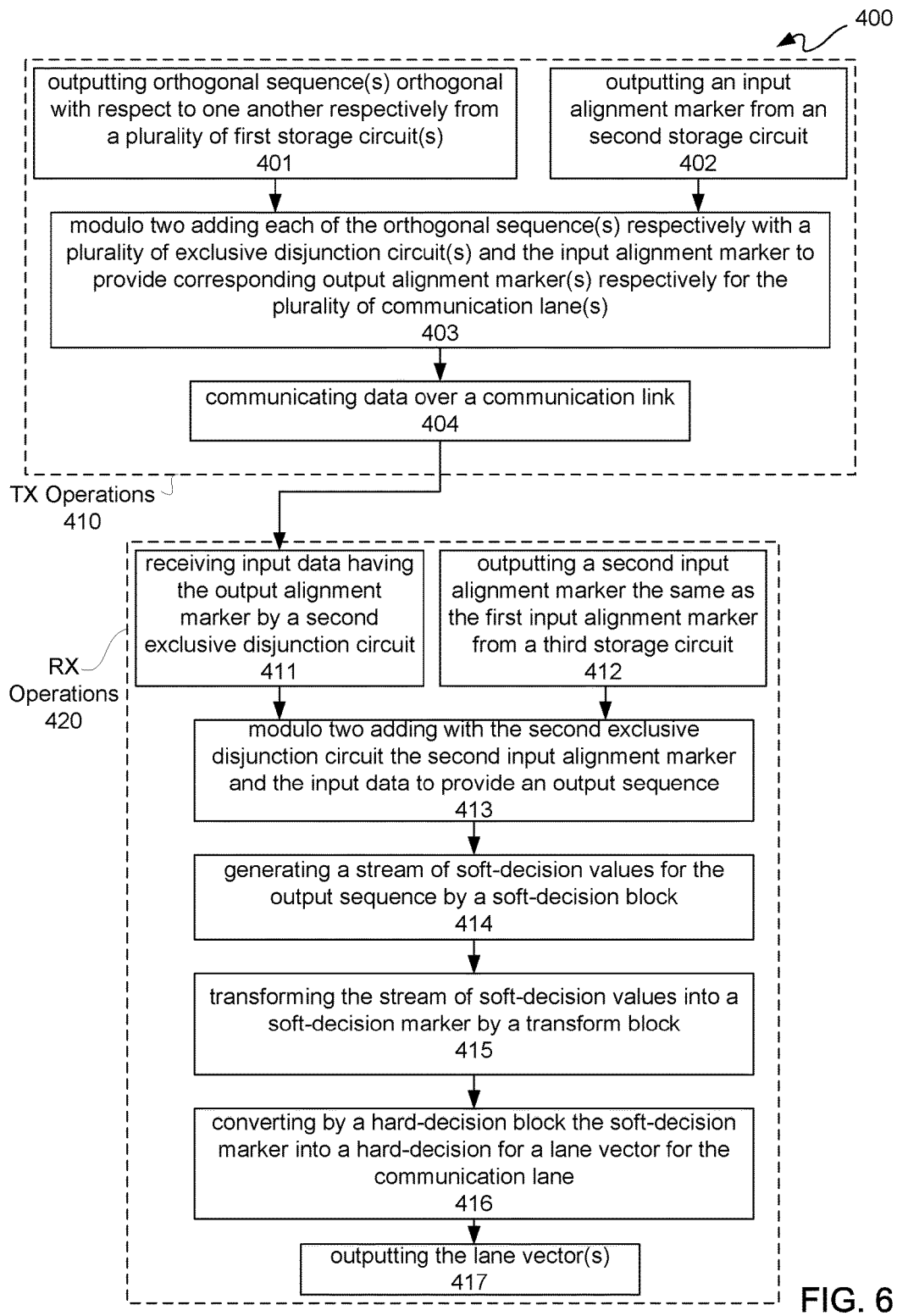
FIG. 6 is a flow diagram illustratively depicting an exemplary alignment marker flow for a communication system, such as the communication system described with reference to FIGS. 3A through 5B.
Figure 7:
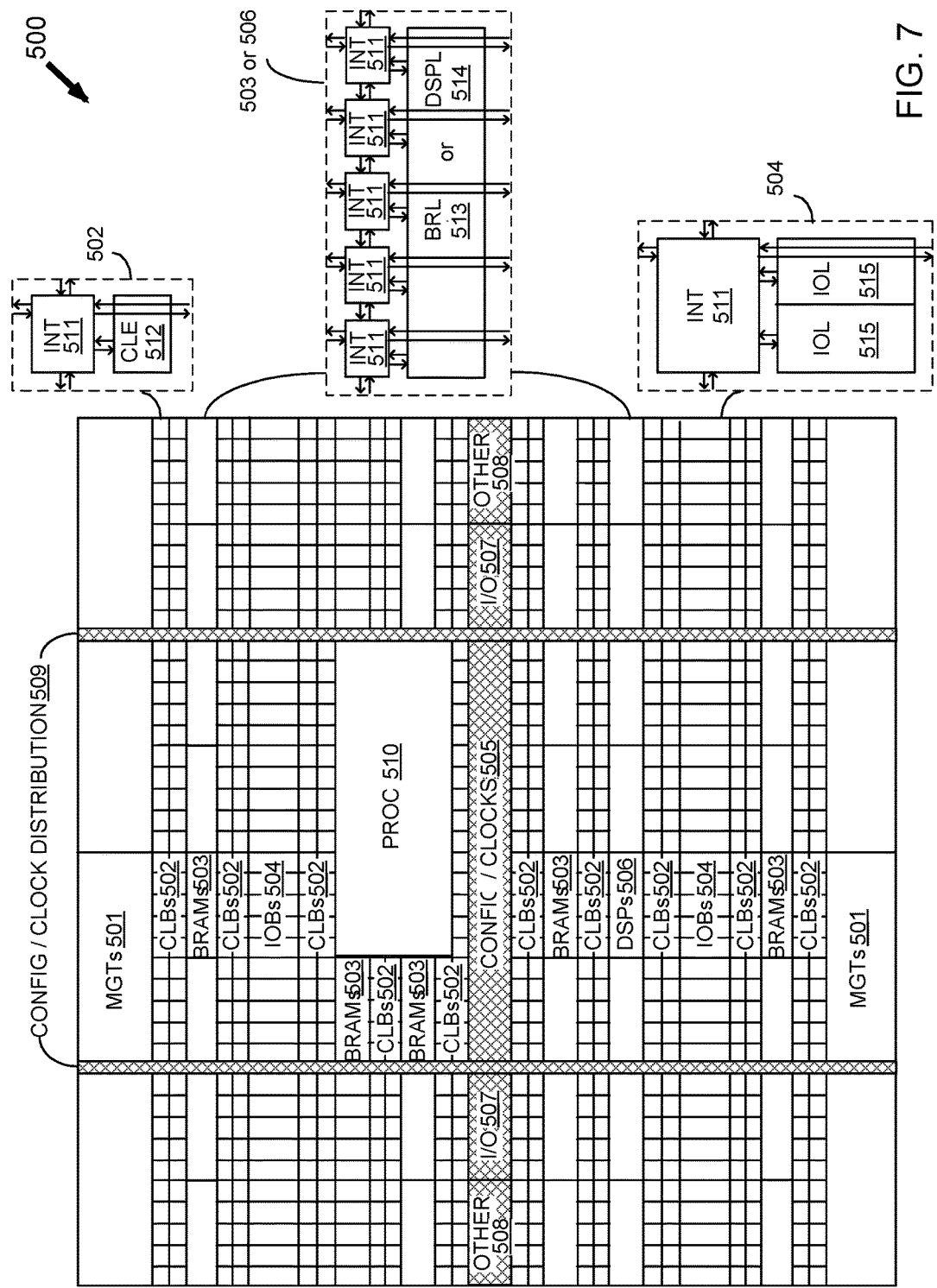
FIG. 7 is a simplified block diagram depicting an exemplary columnar Field Programmable Gate Array ("FPGA") architecture.

FIG. 6 is a flow diagram illustratively depicting an exemplary alignment marker flow 400 for a communication system, such as communication system 130 as described with reference to FIGS. 3A through 5B.

At 401, an orthogonal sequence may be output from a first storage circuit, such as storage circuit 127; or orthogonal sequences orthogonal with respect to one another may be respectively output from a plurality of first storage circuits, such as storage circuits 127. At 402, an input alignment marker, such as AM 125, may be output from a second storage circuit, such as storage circuit 124. At 403, an exclusive disjunction circuit, such as exclusive disjunction circuit 128, may be used to modulo two add, such as by exclusively-ORing, such orthogonal sequence and such input alignment marker to provide an output alignment marker, such as a lane AM 129, for association with a communication lane of a plurality of communication lanes, such as communication lanes 121; or each of such orthogonal sequences may be respectively ORed with a plurality of exclusive disjunction circuits, such as exclusive disjunction circuits 128, and such input alignment marker to provide corresponding output alignment markers, such as a lane AMs 129, respectively for a plurality of communication lanes. At 404, data may be communicated over a communication link, such as communication link 123, having such one or more communication lanes. Operations 401 through 404 may be TX operations 410 associated with any or all of FIGS. 3A through 3C. For example, payload data may be multiplexed with output alignment markers, namely lane AMs 129, for transmission, as previously described.

Operations 411 through 417 may be RX operations 420 associated with any or all of FIGS. 4A through 5B. Along those lines, input data having an output alignment marker, such as a lane AM 129, may be received by an exclusive disjunction circuit, such as exclusive disjunction circuit 128, of a receiver at 411. An input alignment marker, the same as an input alignment marker used by a transmitter, may be output from a storage circuit, such as storage circuit 224, of a receiver at 412. At 413, such input alignment marker from 412 and input data from 411 may be added modulo two, such as by exclusively-ORing with such exclusive disjunction circuit, to provide an output sequence, such as a sequence 221.

At 414, a stream of soft-decision values, such as stream of soft-decision values 324, may be generated by a soft-decision block, such as soft-decision block 322, for such output sequence provided at 413. At 415, such stream of soft-decision values may be transformed into a soft-decision marker, such as a soft-marker 326, by a transform block, such as transformer 325. At 416, a hard-decision block, such as hard decision block 327, may convert such soft-decision marker transformed at 415 into a hard-decision for a lane vector, such as lane vector 229, for a communication lane of a plurality of communication lanes of a communication link, such as communications lanes 121 of a communication link 123. Again, in an implementation, such transforming at 415 may be Walsh-Hadamard transforming, including without limitation a FWHT. Again, such an orthogonal sequence at 401 may be a Hadamard sequence, including without limitation an oversampled Hadamard sequence. At 417, one or more lane vectors 229 may be output.

Other details with respect to such above-described implementations are not repeated for purposes of clarity and not limitation, as alignment marker flow 400 follows from the above description.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 5 illustrates an FPGA architecture 500 that includes a large number of different programmable tiles including multi-gigabit transceivers ("MGTs") 501, configurable logic blocks ("CLBs") 502, random access memory blocks ("BRAMs") 503, input/output blocks ("IOBs") 504, configuration and clocking logic ("CONFIG/CLOCKS") 505, digital signal processing blocks ("DSPs") 506, specialized input/output blocks ("I/O") 507 (e.g., configuration ports and clock ports), and other programmable logic 508 such as digital clock managers, analog-to-digital converters, system monitoring logic, and so forth. Some FPGAs also include dedicated processor blocks ("PROC") 510.

In some FPGAs, each programmable tile includes a programmable interconnect element ("INT") 511 having standardized connections to and from a corresponding interconnect element in each adjacent tile. Therefore, the programmable interconnect elements taken together implement the programmable interconnect structure for the illustrated FPGA. The programmable interconnect element 511 also includes the connections to and from the programmable logic element within the same tile, as shown by the examples included at the top of FIG. 5.

For example, a CLB 502 can include a configurable logic element ("CLE") 512 that can be programmed to implement user logic plus a single programmable interconnect element ("INT") 511. A BRAM 503 can include a BRAM logic element ("BRL") 513 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 506 can include a DSP logic element ("DSPL") 514 in addition to an appropriate number of programmable interconnect elements. An 10B 504 can include, for example, two instances of an input/output logic element ("IOL") 515 in addition to one instance of the programmable interconnect element 511. As will be clear to those of skill in the art, the actual I/O pads connected, for example, to the I/O logic element 515 typically are not confined to the area of the input/output logic element 515.

In the pictured embodiment, a horizontal area near the center of the die (shown in FIG. 5) is used for configuration, clock, and other control logic. Vertical columns 509 extending from this horizontal area or column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, processor block 510 spans several columns of CLBs and BRAMs.

Note that FIG. 5 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 5 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus for transmission, comprising:
   a plurality of communication lanes;
   a plurality of transmission circuits configured to provide, for each communication lane of the plurality of communication lanes, an output alignment marker representing an exclusive disjunction of an orthogonal sequence of a plurality of orthogonal sequences and an input alignment marker; and
   a plurality of multiplexers, wherein each multiplexer is configured to multiplex an output alignment marker with payload data for a communication lane of the plurality of communication lanes for transmission via a communication lane of the plurality of communication lanes.

2. The apparatus according to claim 1, wherein the plurality of transmission circuits comprises:
   storage circuits configured to output the input alignment marker and corresponding orthogonal sequences, including the orthogonal sequence stored, the orthogonal sequences being orthogonal with respect to one another; and
   exclusive disjunction circuits configured to receive the input alignment marker and respectively receive the orthogonal sequences and to respectively exclusively-OR each of the orthogonal sequences with the input alignment marker to provide corresponding output alignment markers, for the plurality of communication lanes, respectively.

3. The apparatus according to claim 2, wherein the plurality of communication lanes includes at least two physical lanes.

4. The apparatus according to claim 2, wherein:
   the storage circuits include a plurality of registers;
   the exclusive disjunction circuits include a plurality of exclusive-OR gates; and
   a register of the plurality of registers is configured to provide the input alignment marker to each of the exclusive-OR gates.

5. The apparatus according to claim 2, wherein:
   the orthogonal sequences are Hadamard sequences; and
   the input alignment marker and the Hadamard sequences are all constant values.

6. The apparatus according to claim 2, wherein the orthogonal sequences are a plurality of Hadamard sequences.

7. The apparatus according to claim 6, further comprising:
   oversamplers configured to oversample the plurality of Hadamard sequences to correspondingly provide a plurality of oversampled Hadamard sequences;
   the exclusive disjunction circuits are a plurality of exclusive-OR gates configured to respectively exclusively-OR the plurality of oversampled Hadamard sequences with the input alignment marker; and
   a storage circuit of the storage circuits is configured to provide the input alignment marker to each of the exclusive-OR gates.

8. A method for communication, comprising:
   outputting orthogonal sequences orthogonal with respect to one another respectively from a plurality of first storage circuits;
   outputting a first input alignment marker from a second storage circuit; and
   modulo two adding, with a plurality of exclusive disjunction circuits, each of the orthogonal sequences respectively and the first input alignment marker to provide corresponding output alignment markers respectively for a plurality of communication lanes.

9. The method according to claim 8, further comprising receiving, in a communication lane of the plurality of communication lanes, input data having an output alignment marker;
   outputting a second input alignment marker that is the same as the first input alignment marker from a third storage circuit;
   modulo two adding with an exclusive disjunction circuit the second input alignment marker and the input data to provide an output sequence;
   generating a stream of soft-decision values for the output sequence by a soft-decision block;
   transforming the stream of soft-decision values into a soft-decision marker by a transform block; and
   converting by a hard-decision block the soft-decision marker into a hard-decision for a lane vector for the communication lane.

10. The method according to claim 9, wherein the transforming is a Walsh-Hadamard transforming.

11. The method according to claim 9, wherein the orthogonal sequence is an oversampled Hadamard sequence.

* * * * *